(12) United States Patent
Fugate et al.

(10) Patent No.: US 10,972,501 B2
(45) Date of Patent: Apr. 6, 2021

(54) METHOD AND SYSTEM FOR IMPROVING NETWORK AND SOFTWARE SECURITY USING SHARED TRUST AND AN EGRESS MAN-IN-THE-MIDDLE (MITM) ALGORITHM FOR PERFORMING CLANDESTINE TRAFFIC MODIFICATION

(71) Applicant: United States Government as represented by the Secretary of the Navy, San Diego, CA (US)

(72) Inventors: Sunny James Fugate, San Diego, CA (US); Bradley Michael Flamm, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 396 days.

(21) Appl. No.: 16/181,172

(22) Filed: Nov. 5, 2018

(65) Prior Publication Data
US 2020/0145456 A1    May 7, 2020

(51) Int. Cl.
*H04L 29/06* (2006.01)
*H04L 12/24* (2006.01)
*H04L 9/08* (2006.01)

(52) U.S. Cl.
CPC ........ *H04L 63/1475* (2013.01); *H04L 9/0891* (2013.01); *H04L 41/147* (2013.01); *H04L 63/1466* (2013.01)

(58) Field of Classification Search
CPC . H04L 63/1475; H04L 41/147; H04L 9/0891; H04L 63/1466; H04L 41/142; H04L 41/16; H04L 63/0464; H04L 63/1416
See application file for complete search history.

(56) References Cited

U.S. PATENT DOCUMENTS

| | | | |
|---|---|---|---|
| 5,915,087 A | 6/1999 | Hammond et al. | |
| 6,272,492 B1 | 8/2001 | Kay | |
| 6,732,269 B1 | 5/2004 | Baskey et al. | |

(Continued)

OTHER PUBLICATIONS

Wikipedia; Squid (Software); https://en.wikipedia.org/wiki/Squid_(software) (accessed Oct. 22, 2018).

(Continued)

*Primary Examiner* — Christopher A Revak
(74) *Attorney, Agent, or Firm* — Naval Information Warfare Center, Pacific; Kyle Eppele; J. Eric Anderson (57) ABSTRACT

An egress man-in-the-middle (MITM) system comprising: a trusted computing asset disposed in a first local subnet and connected to a computer network; and an egress MITM effector disposed in the first local subnet and configured to passively monitor incoming network traffic to the trusted computing asset, and further configured to obfuscate true information regarding the trusted computing asset to other computing assets on the computer network by transmitting, as if from the trusted computing asset, a spoofed response in answer to selected incoming network traffic, wherein the spoofed response comprises false or misleading information regarding the trusted computing asset thereby protecting the trusted computing asset from attack.

8 Claims, 3 Drawing Sheets

(56) References Cited

U.S. PATENT DOCUMENTS

| | | |
|---|---|---|
| 6,959,318 B1 | 10/2005 | Tso |
| 9,160,718 B2 | 10/2015 | Martini |
| 10,574,698 B1* | 2/2020 | Sharifi Mehr ...... H04L 63/1491 |
| 2004/0073629 A1 | 4/2004 | Bazot et al. |
| 2004/0148521 A1 | 7/2004 | Cohen et al. |
| 2007/0025374 A1 | 2/2007 | Stefan et al. |
| 2010/0074112 A1 | 3/2010 | Derr et al. |
| 2012/0297457 A1* | 11/2012 | Schulte ................ H04L 63/145 |
| | | 726/4 |
| 2014/0269299 A1 | 9/2014 | Koornstra |
| 2016/0119374 A1 | 4/2016 | Williams et al. |
| 2019/0207954 A1* | 7/2019 | Ahuja ................ H04L 63/0236 |
| 2020/0067700 A1* | 2/2020 | Bergeron ................ G06F 21/53 |

OTHER PUBLICATIONS

Wikipedia; Comparison of Firewalls; https://en.wikipedia.org/wiki/Comparison_of_firewalls (accessed Oct. 22, 2018).
Cisco; Products, Next Generation Firewalls; http://www.cisco.com/c/en/us/products/security/firewalls/index.html (accessed Nov. 1, 2018).
Wikipedia; Snort (software); https://en.wikipedia.org/wiki/Snort_(software), (accessed Nov. 1, 2018).
Wikipedia; Burp Suite; https://en.wikipedia.org/wiki/Burp_suite, (accessed Nov. 1, 2018).
Wikipedia; Man-In-The-Middle Attack; https://en.wikipedia.org/wiki/Man-in-the-middle_attack, (accessed Nov. 1, 2018).
Cooper, Stephen; 10 Top Intrusion Detection Tools for 2018; https://www.comparitech.com/net-admin/network-intrusion-detection-tools/ (accessed Nov. 1, 2018).
HAK5; WiFi Pineapple ; https://hakshop.com/products/wifi-pineapple (accessed Nov. 1, 2018).
Wikipedia; DSniff—https://en.wikipedia.org/wiki/DSniff (accessed Nov. 1, 2018).

\* cited by examiner

METHOD AND SYSTEM FOR IMPROVING NETWORK AND SOFTWARE SECURITY USING SHARED TRUST AND AN EGRESS MAN-IN-THE-MIDDLE (MITM) ALGORITHM FOR PERFORMING CLANDESTINE TRAFFIC MODIFICATION

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 105762.

BACKGROUND OF THE INVENTION

A traditional man-in-the-middle attack relies on an intermediary which can control the flow of traffic between two endpoints, modifying this traffic in malicious ways to gain advantage, exfiltrate information, or disrupt communications. There exists a need for a new method for disrupting attacks and other potentially malicious network activity.

SUMMARY

Disclosed herein is an egress man-in-the-middle (MITM) system comprising: a trusted computing asset and an egress MITM effector. The trusted computing asset is disposed in a first local subnet and connected to a computer network. The egress MITM effector is also disposed in the first local subnet and is configured to passively monitor incoming network traffic to the trusted computing asset. The egress MITM effector is further configured to obfuscate true information regarding the trusted computing asset to other computing assets on the computer network by transmitting, as if from the trusted computing asset, a spoofed response in answer to selected incoming network traffic. The spoofed response comprises false or misleading information regarding the trusted computing asset thereby protecting the trusted computing asset from attack.

The egress MITM system may be used to protect the trusted computing asset from a cyber-attack according to the following method steps. The first step provides for predicting, using a machine learning algorithm, content and features of required responses by the trusted computing asset to network request packets from an untrusted host, wherein the trusted computing asset is disposed in a first local subnet and connected to a computer network. The next step provides for storing the content and features of predicted responses in a rule base. The next step provides for passively monitoring, but not interrupting, incoming request packets made by the untrusted host to the trusted computing asset. The monitoring is performed by an egress MITM effector is disposed in the first local subnet as well. The next step provides for choosing from the rule base an appropriate response to a given request packet based on contents of the given request packet. The next step provides for modifying the appropriate response to create a spoofed response that comprises false or misleading information regarding the trusted computing asset. The next step provides for transmitting the spoofed response to the untrusted host prior to a response from the trusted computing asset in order to obfuscate true information regarding the trusted computing asset thereby protecting the trusted computing asset from attack.

In another embodiment, the egress MITM effector may be used to protect the trusted computing asset from a cyber-attack according to the following method steps. The first step provides for storing known content and features of required responses of the trusted computing asset to network request packets from an untrusted host in a rule base, wherein the trusted computing asset is disposed in a first local subnet and connected to a computer network. The next step provides for passively monitoring, but not interrupting, incoming request packets made by the untrusted host to the trusted computing asset. The next step provides for choosing from the rule base an appropriate response to a given request packet based on contents of the given request packet. The next step provides for modifying the appropriate response to create a spoofed response that comprises false or misleading information regarding the trusted computing asset. The next step provides for transmitting the spoofed response to the untrusted host either prior to or in lieu of a response from the trusted computing asset in order to obfuscate true information regarding the trusted computing asset thereby protecting the trusted computing asset from attack.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed method and system below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
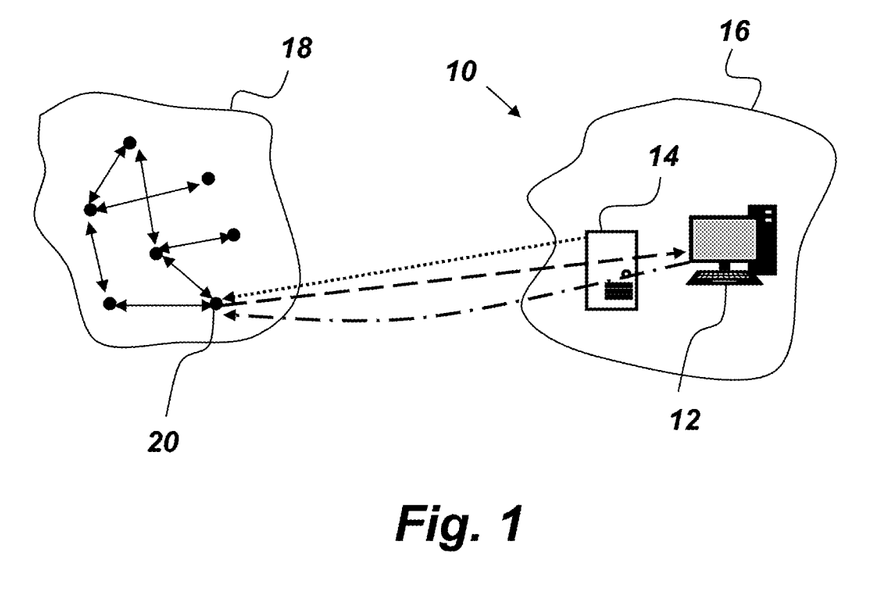
FIG. 1 is a conceptual illustration of an egress MITM system.

FIG. 1 is an illustration of an egress MITM system 10 that comprises, consists of, or consists essentially of a trusted computing asset 12 and an egress MITM effector 14. The trusted computing asset 12 is disposed in a first local subnet 16 and connected to a computer network 18. The egress MITM effector 14 is disposed in the same network segment (i.e., the first local subnet 16) and is configured to passively monitor incoming network traffic (represented by the long-dashed line) to the trusted computing asset 12. As used herein, an effector may be defined as a software component to carry out a particular action in accordance with a set of rules or policy with the intended effect of achieving a particular result or consequence. For example, an effector may be configured using a set of input parameters and which acts directly on a physical system such as the trusted computing asset 12. The egress MITM effector 14 in this specification is able to take as an input the parameters of a particular transmission control protocol (TCP) or user datagram protocol (UDP) stream to be interfered with along with a specification of a desired effect. The specific parameters will vary depending on the functionality of the specific application. For example, these parameters may consist of source port, source address, destination port, destination address, protocol, stream characteristics (such as session ID and sequence numbers), and a specification of the application level effect that is desired (such as masking of server version strings). Upon execution, a given embodiment of the egress MITM effector 14 may be configured to perform either a discrete, one-shot action or a continuous sequence of actions according to the chosen specification and depending on the type of transport and application layer protocol being manipulated. For example, a discrete, one-shot action may be to cause corruption of a single packet's contents to interfere with and cause restart of a session (if corrupting session initialization packets) or retransmission of packet (if corrupting data packets). A continuous sequence of actions may be to mask each application-layer initialization packet by transforming application header strings to map strings indicating vulnerable versions of application software to non-vulnerable version strings (or vice versa).

The egress MITM effector 14 is further configured to obfuscate true information regarding the trusted computing asset 12 to other computing assets on the computer network 18 (such as the untrusted host 20) by transmitting, as if from the trusted computing asset 12, a spoofed response (represented by the dotted line) in answer to selected incoming network traffic. The spoofed response comprises false or misleading information regarding the trusted computing asset 12 thereby protecting the trusted computing asset 12 from attack. The dotted-dashed line in FIG. 1 represents normal outgoing communication from the trusted computing asset 12. Suitable examples of the trusted computing asset 12 include, but are not limited to: a desktop host, a SCADA system, a control system, a network router, a printer, a networked internet-of-things (IoT) device, and a server.

The egress MITM system 10 may be used in an internet-protocol-layer, network-traffic-modification technique which allows a trusted MITM device (e.g., the egress MITM effector 14) to modify outgoing traffic in order to protect and/or obfuscate information which is traditionally disclosed by the trusted computing asset 12 during normal communications. Contrary to the traditional use of the MITM approach as an adversarial technique used to compromise the integrity or confidentiality of information on a network, the egress MITM system 10 may be used in an MITM-like approach to protect critical information from disclosure or alternatively to provide false information for purposes of deceiving an attacking or listening adversary.

The egress MITM system 10 is different from MITM configurations used in offensive MITM attacks. A traditional MITM attack relies on an intermediary which can control the flow of traffic between two endpoints. In a traditional MITM attack, the intermediary modifies this traffic in malicious ways to gain advantage, exfiltrate information, or disrupt communications. The use of the egress MITM system 10, on the other hand, results in an aggressive, on-network method for disrupting potentially malicious activity. The approach used by the egress MITM system 10 changes the conventional trust paradigm of MITM from trust between end users to between one end user and the MITM. The MITM effector 14 only handles outbound traffic from the trusted computing asset 12, maintaining a minimally invasive design by guaranteeing inbound traffic is not touched.

A goal of the egress-MITM system 10 is to modify network traffic flows and content in ways beneficial to the security of trusted computing asset 12 without giving away details to the untrusted host 20. The basic operation of the egress MITM system 10 is to sniff, or monitor, packets from the trusted computing asset 12 to the untrusted host 20 or vice versa and then generate packets to gain a security advantage. The generated packets can be spoofed responses, spurious resets, normalized versions of packets already transmitted, malformed packets, and packets crafted to mask, obscure, and deceive potential attackers. There are a great number of possible use-cases, some which can safely deter adversaries, and others which may negatively impact server behavior in order to prevent ongoing or emerging attacks.

There are at least two basic implementations of the egress MITM system 10. In the first, the trusted computing asset 10 is unaware of the actions taken by the egress-MITM effector 14. This implementation may be limited in scope due to encryption of network traffic between the trusted computing asset 12 and the untrusted host 20 unless server private keys are made available to the egress MITM effector 14. Several behaviors of the egress MITM effector 14 are possible that do not require encryption keys, including manipulation of session initiation packets, address resolution protocol (ARP) poisoning to cause the untrusted host 20 to communicate with the egress-MITM effector 14 instead of the trusted computing asset 12, and predictive packet crafting of malformed content. In a non-participating mode, or first basic implementation, the trusted computing asset 12 sends its outgoing packets but the egress MITM effector has already sent communications on behalf of the trusted computing asset 12 to the untrusted host 20 (which could be an attacker).

In the second basic implementation of the egress MITM system 10, the trusted computing asset 12 collaborates with the egress-MITM effector 14. This setup allows for far more sophisticated behaviors and allows the egress-MITM effector 14 to produce novel scenarios which deceive, deter, and disrupt adversary communication. By sharing information, the trusted computing asset 12 can receive a packet from the untrusted host 20, inform the Egress-MITM effector 14 of the new session, share session keys, and allow the Egress-MITM effector 14 to produce deceptive responses to mask server information or characteristics. A participating trusted computing asset 12 can also receive traffic from an attacker, but send the response through the egress-MITM effector 14, allowing for any number of novel traffic manipulation techniques (normalization, data masking, data removal, delaying communications, forced fragmentation, etc.). In some embodiments, where the trusted computing asset 12 is aware of, and coordinating responses with, the egress MITM effector 14, the trusted computing asset 12 can communicate directly with the egress MITM effector 14 so packets from the trusted computing asset 12 can be manipulated. In other cases, the trusted computing asset 12 will coordinate with the egress MITM effector 14 and simply not send outgoing packets.

In either the blind masking embodiment of egress MITM system 10 (i.e., where the trusted computing asset 12 has no knowledge of the involvement of the egress MITM effector 14) or in the collaborative masking embodiment (i.e., where the trusted computing asset 12 shares additional private knowledge with the egress MITM effector 14) the egress MITM effector 14 can be used to intentionally indicate to the untrusted host 20 that the untrusted host 20's interaction with the trusted computing asset 12 has been detected and that responses from the trusted computing asset 12 to the untrusted host 20 are being manipulated. In this way the egress MITM effector 14 can directly attempt to deter continued connection attempts by disclosing the use of traffic manipulation to the untrusted host 20.

It should be noted that many of the effects of the egress MITM effector 14 can be run at all times for all connections with untrusted hosts 20 on the network 18 with the intent of disrupting attackers while leaving known, non-malicious traffic unaffected. Attackers often have the need to be responsive to particular versions of server or client software (as indicated by server and client banners). This responsiveness (i.e. attacking using a particular version of an exploit which is based on server or client software versions) can allow the egress-MITM effector 14 to tease out the difference between a false positive and a true attacker. A true attacker will often attempt to take advantage of older, more vulnerable server and client software versions by using exploits which are only able to connect to these older versions. This behavior is contrary to normal user behaviors which will use only the updated versions of client software even when the server indicates an older implementation. Client software generally no longer allows reversion to older, less secure protocols due to the potential of downgrade attacks such as the 'POODLE' MITM attack of 2014 which forced downgrade of web server security to an insecure version of Secure Sockets Layer (SSL v3.0). Rather than connect to older, less secure server software, a recent web browser or other client program will refuse the connection. An attacker however will continue the connection and may even seek out server software which present themselves as older versions.

Some approaches to protecting outgoing traffic often rely on filtering of outgoing (or egress) traffic using a proxy server. In these systems an internal system is either: a) preconfigured to transmit a subset of traffic to a computer running a proxy service for a particular port and protocol; or b) all traffic for a particular computer always passes through a proxy service. Egress filtering, in general consists of monitoring, restricting, or modifying outbound traffic from a host when connecting to an external network. The egress MITM effector 14 is not a proxy server and does not rely on egress filtering of traffic. The egress MITM system 10 works so long as the egress MITM effector 14 can be added to a network segment which "sees" the traffic from the trusted computing asset 12, such as the first local subnet 16 depicted in FIG. 1. The egress MITM effector 14 passively sniffs, or monitors, all traffic from the trusted computing asset 12, but does not need to process each packet seen by the egress MITM effector 14. In one embodiment of the egress MITM system 10, the egress MITM effector 14 does not affect the routing of traffic between the trusted computing asset 12 and the untrusted host 20. In particular, this often means that the egress MITM effector 14 sits "adjacent" to the trusted computing asset 12 on the same local subnet 16. In other embodiments, and depending on the configuration of location routing hardware, the egress MITM effector 14 may be configured to listen to a specially configured switched port analyzer SPAN port or mirror port which reproduces all packets for a specific network port, a pre-configured list of ports, or all other ports which are connected to the device which routes traffic for the subnet.

Figure 2:
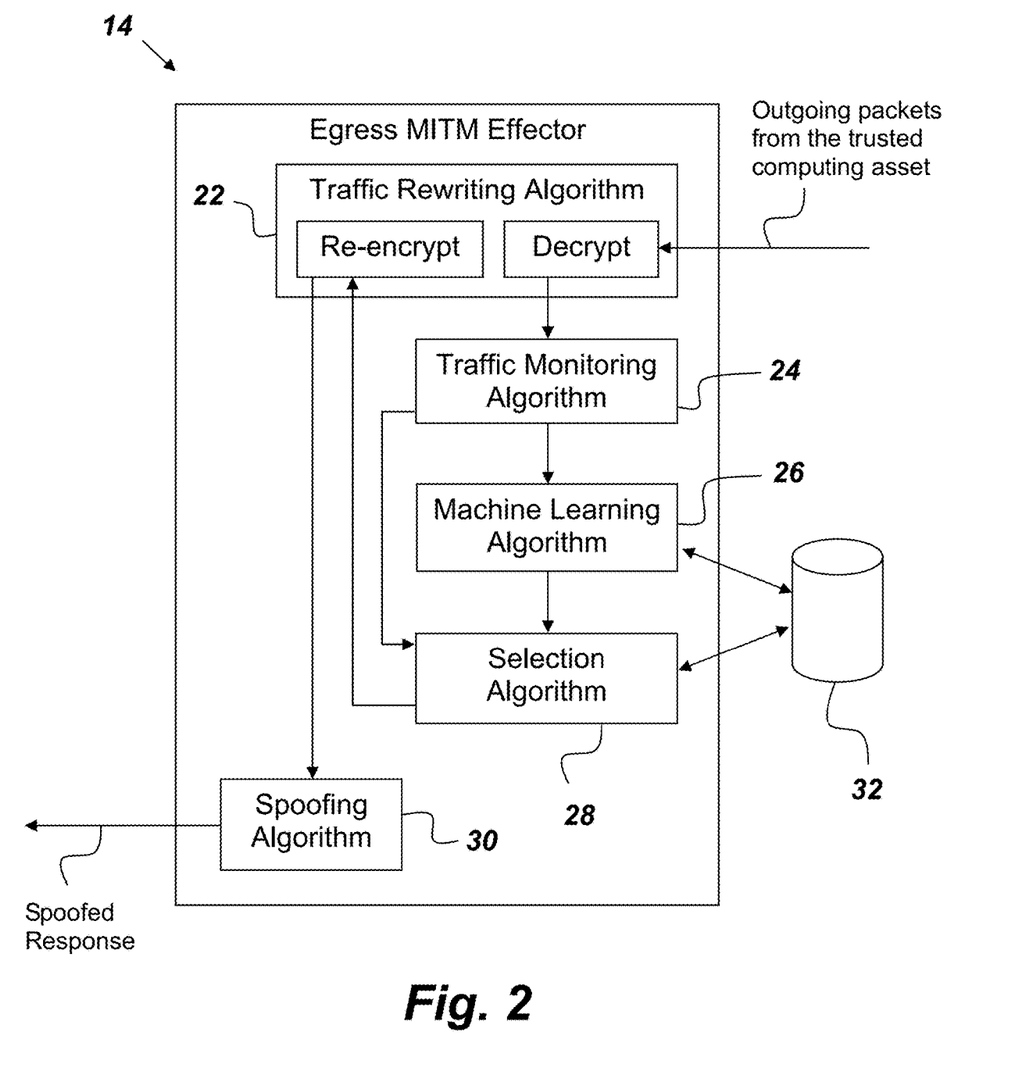
FIG. 2 is a depiction of an egress MITM effector.

FIG. 2 is an illustration of components of a software application embodiment of the egress MITM effector 14. This embodiment of the egress MITM effector 14 comprises a traffic rewriting algorithm 22, a traffic monitoring algorithm 24, a machine learning algorithm 26, a selection algorithm 28, and a spoofing algorithm 30. The traffic rewriting algorithm 22 is configured to decrypt and re-encrypt content of outgoing packets from the trusted computing asset 12 using shared key information so as to maintain cryptographic integrity of packets sent on behalf of the trusted computing asset 12. The traffic monitoring algorithm 24 is configured to monitor the incoming network traffic and outgoing packets from the trusted computer asset 12. Based on the monitored traffic, the connection state, and a partial or full model of the trusted computing asset 10's interactions with the network 18 is estimated. The machine learning algorithm 26 is configured to predict protocol response content and features of outgoing packets from the trusted computing asset 12 based on previously-monitored incoming network traffic and outgoing packets. The predicted protocol response content and features may be stored in a rule-base 32 or extracted directly from observations of prior communications. The selection algorithm 28 comprises feature-rewriting rules for selecting, in real time, suitable content from the predicted protocol response content and features stored in the rule-base 32 to be included in the spoofed response based on content and features of a packet in the incoming network traffic. The spoofing algorithm 30 is configured to predict a packet sequence number and to craft and transmit the spoofed response.

The traffic rewriting algorithm 22 takes input packets and rewrites these packet to incorporate modified content, to remove content, and to add new content. In general, the traffic rewriting algorithm 22 performs modification of individual packets in the context of a sequence of several packets or even an entire TCP session or UDP stream consisting of a sequence of many packets. The traffic rewriting algorithm 22 may be configured to retain the integrity of the internal features of each packet (such as checksums, sequence numbers, and packet IDs) while performing modification, deletion, re-ordering, and insertion of packets and packet contents. One commonly used traffic rewriting algorithm is the "Traffic Control" (tc) utility program available in many operating system environments for manipulating packet contents, timing, and scheduling. In one embodiment, the traffic rewriting algorithm 22 must be aware of the structure of each packet as well as each packet's role in the transport or unigram session and the state of the session in which the packet belongs. The traffic rewriting algorithm 22 can combine both context-free or context dependent modifications—modifying the contents, timing, and ordering of packets in a packet sequence (both within a session and between multiple sessions). A context-free rewriting will modify packet contents, timing, and ordering without consideration of the surrounding packets or sessions. A context-dependent rewriting algorithm will take into consideration surrounding packets or surrounding TCP sessions or UDP streams. The traffic rewriting algorithm 22 can incorporate external data sources (such as a database of features and content) or remapping of data from within the same packet, from within the same session, or from adjacent packets and sessions, or both. These algorithms can utilize a straightforward one-to-one mapping of input bits, bytes, or values to output bits, bytes, or values, and in doing so retain the size of each packet. The traffic rewriting algorithm 22 can also perform modifications of packets and sessions in which additional data is added, in which data is destroyed or removed, or to take into account and combine data from both adjacent and non-adjacent regions of the packet sequence or surrounding sessions. The traffic rewriting algorithm 22 can be any kind of functional mapping from input values to output values such as byte-to-byte mappings and in general may make use of a general-purpose regular expression language to perform sophisticated modifications of input packets into new packets with new values as specified in a regular expression. The traffic rewriting algorithm 22 may also make direct use of a machine learning algorithm which has been trained to take one or more of the following as an input: packet features, entire packets, packet sequences, entire sessions, or relationships between multiple packets, packets and sessions, or between multiple sessions. The machine learning algorithm being used by the traffic rewriting algorithm 22 may further be trained to produce one or more of the following as an output: individual packet features, entire packets, packet sequences, entire sessions, or manipulations, deletions, or additions of packet features, packet contents, entire packets, packet orderings, or TCP sessions or UDP streams.

The traffic monitoring algorithm 24 will generally comprise one of any number of techniques for measuring packet flow over a network and may incorporate the use of one or more of the following: a switched port analyzer (SPAN) port on a traditional router (where all packets for all router ports are rebroadcasted for diagnostic or traffic monitoring purposes); the use of port mirroring where all traffic for a particular port is mirrored to a new port for purposes of traffic monitoring; the use of a traffic sniffing program such as 'tcpdump'; or the use of direct-memory-access techniques for measuring packet flows and features while packets are still resident in memory on network interface cards such as Packet Filter Ring (PFRing). A suitable example embodiment of the traffic monitoring algorithm 24 is disclosed in U.S. patent application 20100074112A1 by Kurt Derr and Milos Manic, which is incorporated herein by reference.

The machine learning algorithm 26 may take as input features any subset of the contents or header of each TCP or UDP packet which passes the traffic monitoring algorithm 24. The machine learning algorithm 26 can also take input features which span multiple packets, from the TCP session or UDP stream being inspected, or from the application layer that may consist of application layer headers or application layer content. Using one or more of these inputs, the machine learning algorithm 26 may be trained to produce outputs which are correctly formatted and consistent with protocol specification but with rewritten content. Suitable examples of the machine learning algorithm 26 include, but are not limited to, general-purpose machine learning algorithms that can consist of any number of techniques for mapping input values, x, to new output values f(x), including, but not limited to: neural networks trained to directly map input packet and session features to modified output packet and session features; n-ary decision trees with learned probabilities for mapping input packet features to modified output packet features; combinations of classifiers such as Support Vector Machines or Linear Discriminant Analysis used to classify the contents or features of packets as belonging to one or more categories or classes and then applying rule-based or machine-learning-based mapping based on these categories of input features to output features; simple linear regression and interpolation to produce packets which map input feature values to new values that match the linear trend of input values; more complex forms of logistic or polynomial regression to map input values to new values which map to logistic or polynomial functional shape of a series of input values; reinforcement learning algorithms (such as Q-Learning, State-Action-Reward-State-Actions, or Deep Q Networks) which modify the parameters of other machine learning algorithms based on the success or failure of a particular mapping of input data and features to output data and features based on a reward signal produced by the traffic spoofing algorithm; and genetic algorithms which can be used to mutate packet features through using mutation operations such as addition, deletion, single-point cross-over, and dual-point cross-over mixing features between application layer contents, TCP session and UDP stream layer contents, and individual packet contents as well as mixing header values and other features between packets, sessions, and application layer headers.

An example of the selection algorithm 28 is a packet selection algorithm based on the use of a Machine Learning classifier which is trained to identify packets, packet features, sessions, or sequences of packets or sessions which are suitable for manipulation by the traffic rewriting algorithm 22. Another embodiment of the selection algorithm 28 incorporates the use of Berkeley Packet Filter expressions (BPF expressions) which may consist of packet-header features such as source and destination port, address, and protocol, as well as flags and session state (closed, listening, established, etc). The selection algorithm 28 can be run in user-space using a utility such as Traffic Control or at a kernel-level using a utility such as PFRing.

The spoofing algorithm 30 may take the output packets from the traffic rewriting algorithm 22 and transmit these packets on a network interface which is configured to allow raw ethernet frames to be written. This allows the spoofing algorithm 30 to match the identity of the transmitting system by writing the frame with the MAC address of the original source. The spoofing algorithm 30 may also ensure packet integrity is retained and that all checksums and integrity checks are valid and that the packet would likely be accepted by a recipient machine (such as the untrusted host 20). The spoofing algorithm 20 may make use of information from the original packet (such as timing information) to determine whether it is safe to transmit the newly modified packet. In some cases, the trusted computing asset 12 may have already sent additional packets or may have already received acknowledgement for the packet being processed. In some cases, this would mean that the modified packet would be dropped by the spoofing algorithm 30 rather than transmitted. The spoofing algorithm 30 can also provide indicators of success or failure of the attempted packet spoofing by monitoring additional responses from the untrusted host 20. The success or failure of the spoofing attempt can directly inform reinforcement learning algorithms used within the machine learning algorithm 26 and allow the machine learning algorithm 26 to adapt to changing network conditions, changing trusted host behaviors (such as new server software being installed), or changing attacker behaviors (such as new attack techniques).

The spoofing algorithm 30 may use a rule-based response predictor in order to craft and transmit spoofed responses prior to actual responses from the trusted computing asset 12. In operation, the egress MITM system 10 listens to incoming traffic (requests) and generates spoofed responses in such a way as to beat network race conditions (i.e., the spoofed response is transmitted before the trusted computing asset 12 has a chance to respond) while maintaining cryptographic (SSL/TLS) integrity of traffic contents. A benefit of the egress MITM system 10 is that no modifications to the trusted computing asset 12 or its software are required in order for the egress MITM effector 14 to function, minimizing the need for changes or modifications to network 18 or system software of the trusted computing asset 12. Additionally, the egress MITM system 10 can be used in such a way that white-listed or approved-connection attempts are ignored by the egress MITM effector 14, while content of responses to all other connections (or a specific list of black-listed connections) can be modified as described above.

The machine learning algorithm 26 may be configured to predict content and features of the trusted computing asset 12's required responses to network request packets from the untrusted host 20 by predicting protocol response content and features of outgoing packets from the trusted computing asset 12 based on previously-monitored incoming network traffic and outgoing packets. The machine learning algorithm 26 may also be configured to optimally interfere with attacker communications based on learned feedback from prior attempts to manipulate outgoing packets (such as spoofing a particular set of application-layer service strings indicating a highly vulnerable trusted host).

Figure 3:
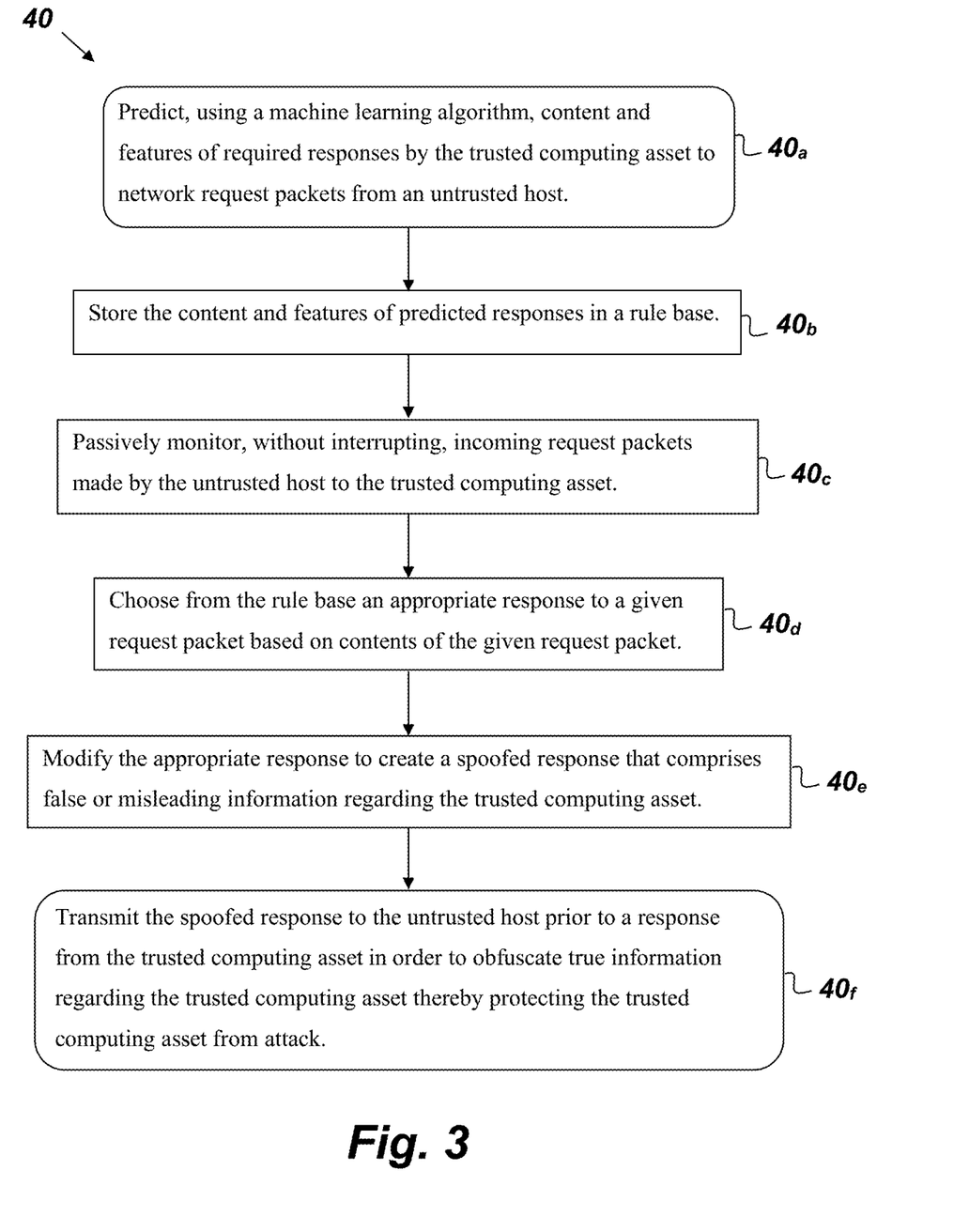
FIG. 3 is a flowchart.

FIG. 3 is a flowchart of a method 40 for protecting a trusted computing asset from a cyber-attack comprising the following steps. The first step $40_a$ provides for predicting, using a machine learning algorithm, content and features of required responses by the trusted computing asset to network request packets from an untrusted host. The trusted computing asset is disposed in a first local subnet and connected to a computer network. The next step $40_b$ provides for storing the content and features of predicted responses in a rule base. The next step $40_c$ provides for passively monitoring, but not interrupting, incoming request packets made by the untrusted host to the trusted computing asset. The monitoring is performed by an egress MITM effector is disposed in the first local subnet as well. The next step $40_d$ provides for choosing from the rule base an appropriate response to a given request packet based on contents of the given request packet. The next step $40_e$ provides for modifying the appropriate response to create a spoofed response that comprises false or misleading information regarding the trusted computing asset. The next step $40_f$ provides for transmitting the spoofed response to the untrusted host prior to a response from the trusted computing asset in order to obfuscate true information regarding the trusted computing asset thereby protecting the trusted computing asset from attack.

The step $40_e$ of modifying the appropriate response to create a spoofed response may further comprise utilizing a selection algorithm comprising feature-rewriting rules for selecting, in real time, suitable content from the predicted protocol response content and features to be included in the spoofed response based on content and features of the incoming request packet, and using a spoofing algorithm configured to predict a packet sequence number.

The method 40 may further comprise the step of using shared trust to decrypt contents of the incoming request packets and using shared trust to encrypt the spoofed response so as to maintain cryptographic integrity of packets sent on behalf of the trusted computing asset. Method 40 may also comprise the step of deducing information about adversary tactics, techniques, and procedures from the network request packets from the untrusted host. The steps of method 40 may be performed without the knowledge or permission of the trusted computing asset.

The steps of an embodiment of method 40 may be summarized as follows:
1. Sniffing new requests made by untrusted hosts to the protected host
2. Using shared trust to decrypt packet contents
3. Using the machine learning algorithm to predict required responses based on packet contents and features
4. Using the rule-base to choose new packet contents and features
5. Using a packet spoofing algorithm to quickly craft a new packet with updated contents and features
6. Using shared trust to re-encrypt packet contents
7. Transmitting this packet on the network The egress MITM system 10 can protect itself against cyber-attacks using a number of novel strategies. For example, the egress MITM system 10 may be employed to build additional checks and safeguards into the network 18 to: mitigate the impact of present advanced persistent threats (APTs); sanitize and normalize outgoing data (preventing data exfiltration); provide robust TCP-spoofing functionality on protected streams, network resource obfuscation; spoof server version strings; spoof resets to disrupt communication between the network and the trusted computing asset; transmit normalized responses to disrupt server responses; transmit malformed packets to cripple brittle exploit programs; normalize outgoing traffic; delay communications; and deceive adversaries in order to gain knowledge of intent.

Some of the aforementioned checks and safeguards of this invention are already possible with traditional proxy servers, firewalls, and routing devices. For example, traditional firewalls and intrusion prevention systems (IPS) are already capable of normalization traffic to prevent unknown or hidden data exfiltration (egress) and exploitation (ingress). These existing tools may also be capable of removing or changing the application or networking stack in order to reduce or remediate an existing attack surface or even to throttle 'bad' traffic. However, existing solutions require either: a) prior coordination and configuration of a system to intentionally utilize a proxy service, or b) for the firewall or routing device to sit in between the protected host and the external systems that it communicates with. The egress MITM system 10, on the other hand, does not require prior coordination or control of the routing device on the network path. Such coordination or control is optional with the egress MITM system 10 and the associated method 40. The egress MITM system 10 and associated method 40 can gain additional capabilities and benefits when the trusted computing asset 12 coordinates its activities in a proxy-like way with the egress MITM effector 14. Unlike a traditional proxy however, the egress MITM effector 14 is watching inbound communication to the trusted computing asset 12 and can perform actions such as spoofing responses and protecting the trusted computing asset 12 by sending packets before the trusted computing asset 12 is able to respond. This is possible because the egress MITM effector 14 does not need to run the entire state-machine of the protocol being used for communications, making response times faster than the receiving host. This approach could be performed at the same places in the network as a traditional IPS, firewalls, or proxy, but a proxy, firewall, or IPS cannot currently be placed beside a protected host on the same subnet and be able to perform these same protection services. The egress MITM effector 14 benefits by this locality, allowing the egress MITM effector 14 to appear as if it is actually the trusted computing asset 12 in respect to reachability from an external attacker. Features such as the TTL (time-to-live) and latency for traffic to and from the egress MITM effector 14 appear the same as the trusted computing asset 12 (as long as the egress MITM effector 14 resides on the same local subnet 16, essentially adjacent to the trusted computing asset 12).

The egress MITM system 10 can also spoof behaviors on behalf of the attacker in order to cause confusion or to contaminate or otherwise deter activity. For example, if an untrusted host 20 were to attempt to run a web crawler on the trusted computing asset 12, the egress MITM effector 14 could be used to release false or partial information as if from the web crawler back to the untrusted host 20 thereby preventing the untrusted host 20 from learning the true or complete information hosted on the trusted computing asset 12. The deceptive actions taken by the MITM system 10 would be difficult to detect by the untrusted host 20. Another novel use case is to use the egress MITM effector 14 with a "participating" trusted computing asset 12 which is aware of and configured to assist the egress MITM effector 14 in performing traffic modification between critical legacy systems in order to escalate security rather than degrade it. Often, systems may require the use of legacy software which has inherent security risks or have limited ability to be upgraded to be made more secure. In such systems, in order to ensure that secure protocols are used, the egress MITM effector 14 could be used to modify the outgoing data stream to use a modern security suite (such as a more recent SSL suite) in order to ensure that each connection is using the latest security. In a sense, this approach essentially just offloads the encryption and authentication task to the egress MITM effector 14. This approach is possible to some extent at a proxy location, but has much higher risk due to the traffic being insecure up to the point of the proxy. Because the egress MITM effector 14 can sit adjacent to the trusted computing asset 12, this reduces the risk of insecure information transfer.

The egress MITM system 10 may be used in one or more different embodiments, or configurations and/or modes of operation including, but not limited to, the following. In a first configuration, the trusted computing asset 12 participates with the egress MITM effector 14 by responding to suspicious communications from an untrusted host 20 by rewriting, with the egress MITM effector 14, selected response packets from the trusted computing asset 12. Packets can be selected for traversal through the Egress-MITM effector 14 based on destination internet protocol (IP), source or destination port, protocol, TCP flags and options, the name of the application or service from which packets are originating, and/or the state of the application or service (initiation, data transmission, termination). This approach (i.e., the first configuration) can use an agent running on the trusted computing asset 12. Alternatively, this approach can use existing firewall and packet forwarding rules to selectively forward packets to the egress-MITM effector 14.

In a second configuration of the egress MITM system 10, the trusted computing asset 12 participates with the egress MITM effector 14 by responding to suspicious connections by rewriting selected response packets to traverse through the egress-MITM effector 14 and where the trusted computing asset 12 also maintains a separate communication channel between the trusted computing asset 12 and the egress-MITM effector 14—this separate connection would be used to provide additional state information or status information. This second configuration is achievable through the use of "proxy" settings on the trusted computing asset 12, allowing a subset of the relevant traffic to be sent through a specified external device (i.e., the egress MITM effector 14). The use of proxy settings, however, under this second configuration would limit the utility of the egress MITM system 10 because only host-initiated connections would be affected and additional care in proxy configuration should be taken to ensure that *all* relevant traffic is routed through the proxy system. A beneficial reason for using existing proxy configuration settings under the second configuration is that the egress MITM effector 14 (proxy in this case) can be located in any network-accessible location.

In a third configuration of the egress MITM system 10, the trusted computing asset 12 is unaware of the involvement of the egress MITM effector 14. In this third configuration, the egress MITM effector 14 must guess/predict the proper responses to incoming network traffic and send them ahead of packets from the trusted computing asset 12. In a fourth configuration of the egress MITM system 10, the trusted computing asset 12 is unaware of the involvement of the egress MITM effector 14 where the egress-MITM effector 14 creates and maintains a number of live connections with the trusted computing asset 12. The egress MITM effector 14 then uses these connections to generate spoofed responses to new connection requests. In one embodiment of the egress MITM system 10 where the trusted computing asset 12 is non-participating (i.e., is unaware of the involvement of the egress MITM effector 14) the egress effector 14 may be configured to detect a new connection between the trusted computing asset 12 and an untrusted host 20 and further configured to force a reset of one or either end of the connection using TCP reset spoofing or an equivalent approach.

The egress MITM effector 14 may be co-located with software running on the trusted computing asset 12 (i.e., residing on the same computing device and utilizing the same network stack). For example, to protect a system which required an obsolete version of a network services (such as a web server or database server), a system could run multiple copies of the service, one which is up-to-date, NEW service and one which is a specific, ALTERNATE version of the service. The local egress MITM effector 14 could then send all incoming packets to both services, keeping them in sync, but selectively choosing responses from either the NEW or the ALTERNATE service. A use case for this scenario is that the ALTERNATE version is required for compatibility reasons, but has a number of known vulnerabilities. The initial response packets, indicating server versions and status could be selected from the NEW service to be sent by the egress MITM effector 14 to the untrusted host 20 to indicate that the service is up-dated and not vulnerable to attack. The remainder of system packets and responses could be selected from the ALTERNATE service in order to maintain compatibility with other devices and services. Another use-case for this embodiment is one in which the NEW service is used for all non-white-listed connection attempts and the ALTERNATE service is used for connection attempts which are white-listed. In this way, an attacker would only be able to interact with the NEW service. Another use case would be to use the ALTERNATE service to indicate to an attacker that a server was running an ALTERNATE service version that has known vulnerabilities in order to cause an attacker to attempt attacks. In this use-case the initial connection and service-related packets would be selected from the ALTERNATE service, but the remaining service-related packets would be selected from the NEW service.

In a rule-based embodiment, the MITM effector 14 may be preconfigured with knowledge of the state machine and protocol specifics of the communication from the trusted computing asset 12. The rule-based approach is useful as it allows the MITM effector 14 to scale based on how much of the trusted computing asset's communications are already modeled. For example, one could implement a system which only concerns itself with masking the true version strings of the Apache Web Server. For something like this, because it is specific, one can easily write a rule which uses simple pattern matching to detect the initial communications and then either uses non-random choice of how to mask this information or makes a random choice.

From the above description of the egress MITM 10 and associated method 40, it is manifest that various techniques may be used for implementing the concepts of the egress MITM 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the egress MITM 10 is not limited to the particular embodiments described herein, but is capable of many embodiments without departing from the scope of the claims.

We claim:

1. An egress man-in-the-middle (MITM) system comprising:
    a trusted computing asset disposed in a first local subnet and connected to a computer network; and
    an egress MITM software application disposed in the first local subnet and configured to passively monitor incoming network traffic to the trusted computing asset, and further configured to obfuscate true information regarding the trusted computing asset to other computing assets on the computer network by transmitting, as if from the trusted computing asset, a spoofed response in answer to selected incoming network traffic, wherein the spoofed response comprises false or misleading information regarding the trusted computing asset thereby protecting the trusted computing asset from attack, wherein the egress MITM software application comprises:
        a traffic rewriting algorithm configured to decrypt and re-encrypt content of outgoing packets from the trusted computing asset using shared key information so as to maintain cryptographic integrity of packets sent on behalf of the trusted computing asset;
        a traffic monitoring algorithm configured to monitor the incoming network traffic and outgoing packets from the trusted computer asset;
        a machine learning algorithm configured to predict protocol response content and features of outgoing packets from the trusted computing asset based on previously-monitored incoming network traffic and outgoing packets;
        a selection algorithm comprising feature-rewriting rules configured to select in real time suitable content from the predicted protocol response content and features to be included in the spoofed response based on content and features of a packet in the incoming network traffic; and
        a spoofing algorithm configured to predict a packet sequence number and to craft and transmit the spoofed response.

2. A method for protecting a trusted computing asset from a cyber-attack comprising:
    predicting, using a machine learning algorithm, content and features of required responses by the trusted computing asset to network request packets from an untrusted host, wherein the trusted computing asset is disposed in a first local subnet and connected to a computer network;
    storing the content and features of predicted responses in a rule base;
    passively monitoring, but not interrupting, incoming request packets made by the untrusted host to the trusted computing asset, wherein the monitoring is performed by an egress man-in-the-middle (MITM) effector disposed in the first local subnet;
    choosing from the rule base an appropriate response to a given request packet based on contents of the given request packet;
    modifying the appropriate response to create a spoofed response that comprises false or misleading information regarding the trusted computing asset; and
    transmitting the spoofed response to the untrusted host prior to a response from the trusted computing asset in order to obfuscate true information regarding the trusted computing asset thereby protecting the trusted computing asset from attack.

3. The method of claim 2, wherein the machine learning algorithm predicts content and features of required responses by the trusted computing asset to network request packets from an untrusted host by predicting protocol response content and features of outgoing packets from the trusted computing asset based on previously-monitored incoming network traffic and outgoing packets.

4. The method of claim 3 wherein the step of modifying the appropriate response to create a spoofed response further comprises utilizing a selection algorithm comprising feature-rewriting rules for selecting, in real time, suitable content from the predicted protocol response content and features to be included in the spoofed response based on content and features of the incoming request packet, and using a spoofing algorithm configured to predict a packet sequence number.

5. The method of claim 2 further comprising using shared trust to decrypt contents of the incoming request packets and using shared trust to encrypt the spoofed response so as to maintain cryptographic integrity of packets sent on behalf of the trusted computing asset.

6. The method of claim 2, wherein the steps are performed without the knowledge or permission of the trusted computing asset.

7. The method of claim 2, further comprising coordinating network traffic management techniques between the trusted computing asset and the egress MITM effector.

8. A method for protecting a trusted computing asset from a cyber-attack through the use of an egress man-in-the-middle (MITM) effector, wherein both the trusted computing asset and the MITM effector are disposed in a first local subnet, and wherein the MITM effector is configured to perform the following steps comprising:
    storing known content and features of required responses of the trusted computing asset to network request packets from an untrusted host in a rule base, wherein the trusted computing asset is disposed in a first local subnet and connected to a computer network;
    passively monitoring, but not interrupting, incoming request packets made by the untrusted host to the trusted computing asset;
    choosing from the rule base an appropriate response to a given request packet based on contents of the given request packet;
    modifying the appropriate response to create a spoofed response that comprises false or misleading information regarding the trusted computing asset; and
    transmitting the spoofed response to the untrusted host either prior to or in lieu of a response from the trusted computing asset in order to obfuscate true information regarding the trusted computing asset thereby protecting the trusted computing asset from attack.

* * * * *